No. 797,114. PATENTED AUG. 15, 1905.
W. R. HILL.
AMBULANCE AND VEHICLE LOADING DEVICE.
APPLICATION FILED FEB. 21, 1905.
2 SHEETS—SHEET 1.
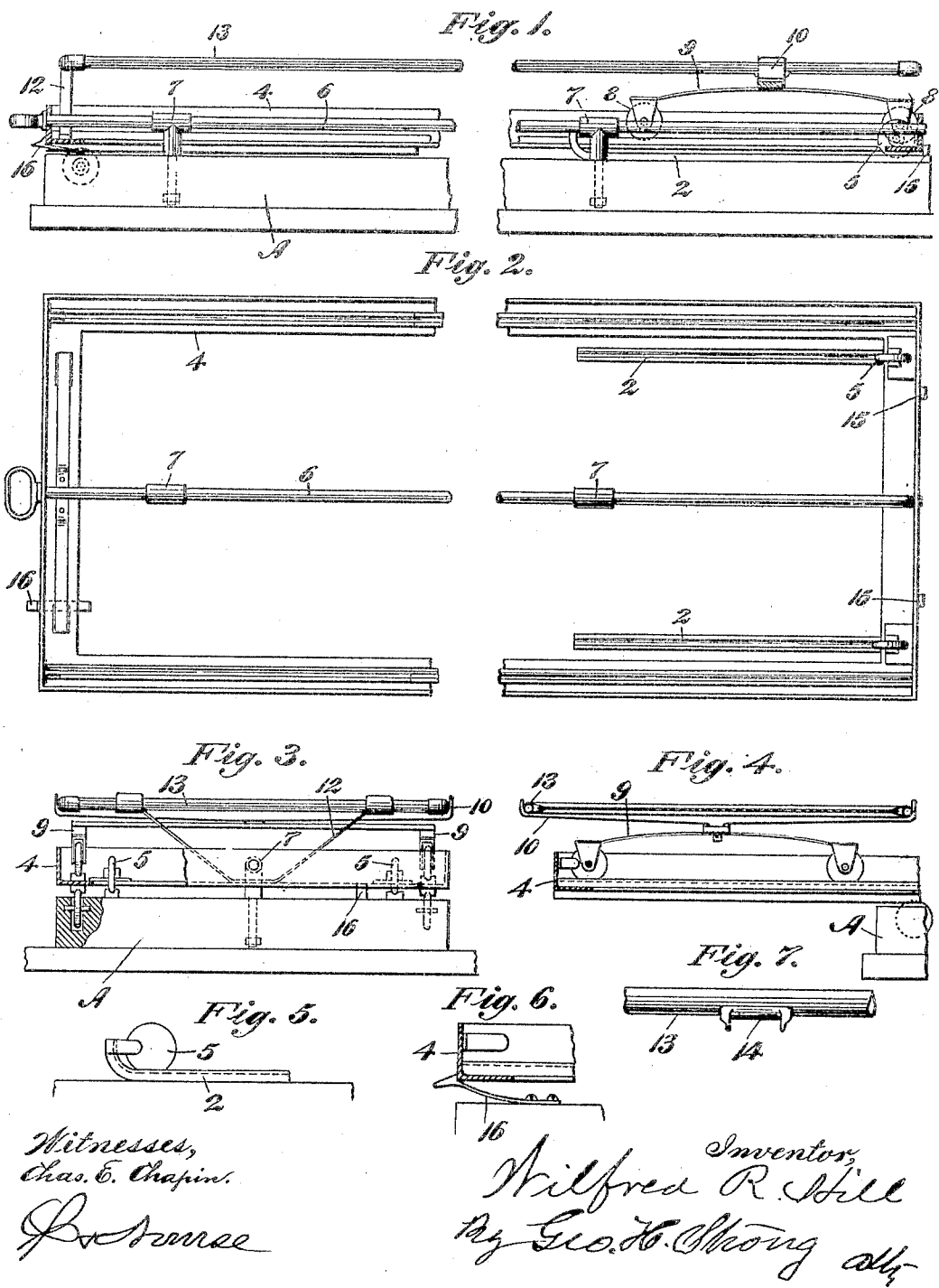

No. 797,114. PATENTED AUG. 15, 1905.
W. R. HILL.
AMBULANCE AND VEHICLE LOADING DEVICE.
APPLICATION FILED FEB. 21, 1905.
2 SHEETS—SHEET 2.
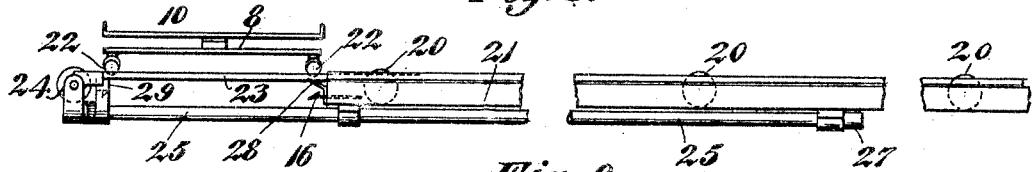
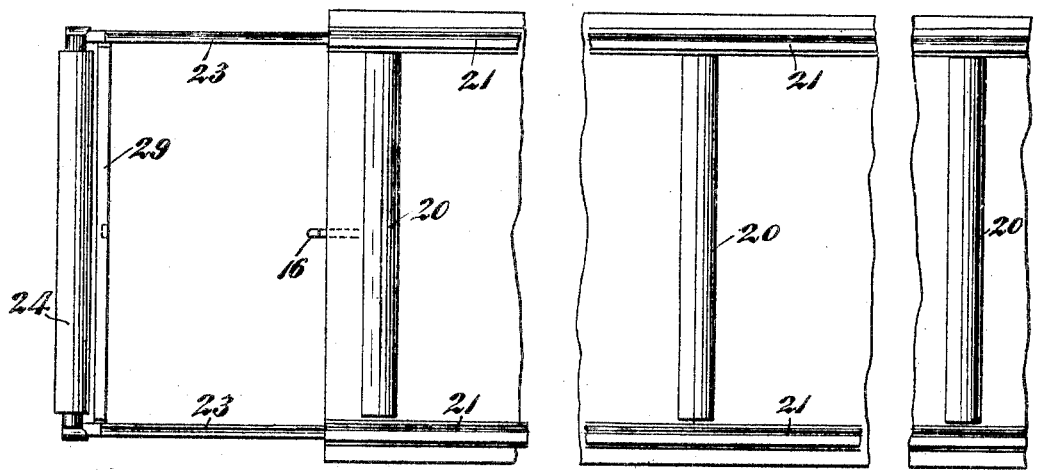
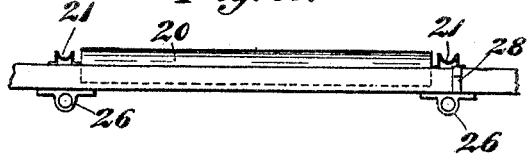
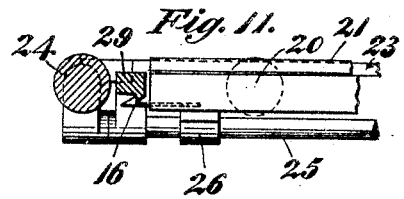
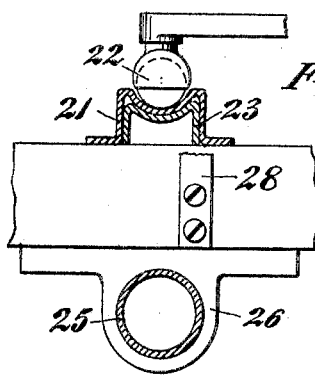
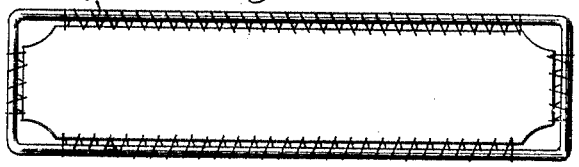
Witnesses,
Chas. E. Chapin.
Inventor;
Wilfred R. Hill
By Geo. H. Strong, Atty.

UNITED STATES PATENT OFFICE.

WILFRED R. HILL, OF SACRAMENTO, CALIFORNIA.

AMBULANCE AND VEHICLE LOADING DEVICE.

No. 797,114.　　　　　Specification of Letters Patent.　　　　Patented Aug. 15, 1905.

Application filed February 21, 1905. Serial No. 246,784.

*To all whom it may concern:*

Be it known that I, WILFRED R. HILL, a citizen of the United States, residing at Sacramento, in the county of Sacramento and State of California, have invented new and useful Improvements in Ambulance and Vehicle Loading Devices, of which the following is a specification.

My invention relates to a device for conveniently loading and unloading vehicles. It is especially designed for use in connection with ambulances and with the stretchers in which sick or injured persons are transported to and from the ambulance. It may also be employed for loading and unloading hearses, dead-wagons, and generally for vehicles carrying heavy goods of any description.

The invention consists of a supplemental bed slidable longitudinally upon the bottom of the ambulance, a truck guided and movable upon the bed, said truck having a turnable bolster upon which one end of the stretcher is supported, and means are provided at the other end of the slidable bed for the support of the opposite end of the stretcher, so that by lifting the rear end of the stretcher the front end mounted upon the truck may be withdrawn to the rear end of the movable bed after the latter has been partially withdrawn from the vehicle, and the turnable bolster allows the stretcher to be turned at right angles with the vehicle, so that the attendants can easily lift it and carry it away or return it in the same manner.

My invention also comprises details of construction, which will be more fully explained by reference to the accompanying drawings, in which—

Figure 1 is a side elevation, partly in section, of my device. Fig. 2 is a plan view of the same. Fig. 3 is a rear end view, partly in section, of the same. Fig. 4 is a partial view showing the truck pulled out and turned. Fig. 5 shows the stop for the bed-wheels. Fig. 6 shows the latch for the bed. Fig. 7 is a view of the notches on the stretcher-frame. Fig. 8 is a side elevation of a modified form adapted for a hearse with the extension pulled out. Fig. 9 is a plan view of the same. Fig. 10 is a rear view of the hearse-floor, showing the rollers and the track. Fig. 11 is a view, partly in section, showing the roller shoved in and latched. Fig. 12 is an enlarged view showing the tracks telescoped. Fig. 13 is a plan view of the stretcher.

In carrying sick or injured persons upon a stretcher which must afterward be transferred to an ambulance or the like it is difficult for those carrying the stretcher to place it and its burden properly within the ambulance, and especially if the burden is heavy, as one of the carriers must ascend the rear steps or otherwise get into the vehicle in order to carry his end to the front and afterward be able to get out again, and this in a closed vehicle, such as an ambulance, is difficult to accomplish.

The device may be variously constructed. As herein shown, A represents a platform of suitable size and material which may be fixed in the bottom of the vehicle so as to be removable; but this platform is not always necessary, as the device may be fitted directly to the bottom of the vehicle. Tracks 2 of any suitable description are fixed to the platform or vehicle-bed, and these tracks serve to support the bed 4, which has wheels or rollers 5 journaled upon it and adapted to travel upon the tracks. It will be understood that the position of these parts may be reversed, the tracks being fixed to the movable bed and the wheels to the platform or bed of the vehicle; but I prefer the first construction.

The bed 4 may be made of any suitable material, such as wood or angle-iron, and the tracks may also be made of similar material.

In order to maintain the bed or car 4 in place and keep the wheels from leaving the track, I have shown a guide-rod, as at 6, this rod passing through sleeves or bushings, as at 7, which project up from the bottom of the vehicle. The rod may extend through the rear end of the bed 4 and be detachably secured in the front end, so that if it is desired to entirely remove the traveling bed 4 it can be done by first removing the rod and freeing the part 4. This bed 4 has suitable tracks formed within it, and upon these tracks a truck 8 is adapted to travel. This truck is preferably made elastic and may be composed of arched or elastic sides, as at 9, having a transverse bar connecting the center of the arches, and upon this bar is a central turnable bolster 10. The bolster itself may also be elastic, and in this manner the stretcher to be supported thereon will be additionally relieved of shocks caused by the vehicle traveling over rough roads or pavements.

The wheels of the truck may be of rubber or other suitable material.

At the rear end of the part 4 is an elastic support, as shown at 12, the height being the same as that of the bolster.

The stretcher 13 is made of any usual or suitable form. The side bars are here shown as notched at 14, so as to rest upon and be retained in proper position upon the bolster, and the rear transverse bar of the stretcher may rest in the elastic support 12.

The front end of the platform A has a stop, as at 15, and near the rear end is an elastic stop 16, so that when the movable bed 4 is pushed into the ambulance the front stop limits its movement, and the rear stop prevents its being withdrawn until said stop has been depressed. The stretcher being supported upon the bolster in front and the elastic support at the rear, if it is desired to remove it from the ambulance the rear spring-catch is disengaged and the bed 4 is drawn backward, rolling upon the supporting-tracks until it projects a short distance to the rear of the vehicle, this distance being a little greater than the width of the stretcher. The rod sliding in the guides will prevent the part 4 from tilting, and it is arrested against one of the guides or any suitable stop when it has been sufficiently withdrawn. The rear end of the stretcher may then be lifted from its support and drawn backward, the truck upon which the bolster is supported moving easily upon its guide-rails or support until the truck has arrived at the rear end of the bed 4. The stretcher is then entirely clear of the vehicle, and the bearers may turn it around, the bolster serving as its turning-pivot until it stands at substantially right angles with the position of the vehicle. The bearers will then have easy access to the head of the stretcher, and it may be lifted from the bolster and carried in the usual manner of carrying stretchers. It will be understood that the reverse movement will take place when the stretcher is to be placed in the ambulance, the head being first placed upon the bolster when the latter is projected beyond the rear of the vehicle, as previously described. Then the stretcher is brought into line with the part 4, and by pushing it forward the truck upon which the bolster is supported will move to the front end of the part 4. The rear end of the stretcher is then laid upon its support and the part 4 is pushed into the vehicle and latched in place.

By a similar construction, modified to suit the character of the burden, the device may be employed in conjunction with hearses or wagons for transporting dead bodies and for other vehicles which it is desired to conveniently load with heavy burdens. In this construction the bed or body may have the usual permanently-journaled rollers 20, extending transversely. Upon each side of these rollers is fitted a track 21, having preferably a groove made concaved in cross-section. The bed or carriage 8 is provided with rollers, as at 22, which are adapted to travel in these tracks. These wheels or rollers may be of any suitable variety. I have found that ball-bearing rollers similar to casters are very suitable for this purpose. The tracks 21 are made hollow, and within the hollow interior are slidable the bars 23, which are of similar shape. These bars have journaled on their outer ends a roller 24, which by reason of the bars 23 sliding in line with the tracks 21 will keep the roller 24 substantially in line with the rollers 20. The journal-boxes of the roller 24 are supported upon stout rods 25, which are slidable in sleeves or guides 26, fixed beneath the wagon-bed. These bars 25 have upon them collars or stops 27, which serve to limit the rearward movement of the bars 25, and with them the bars 23. The truck 8 is fitted, as previously described, with the bolster 10, turnable upon the central pivot, and this truck may be moved back and forward upon the tracks 21 and 23, the surfaces of the tracks being in practice so made that the truck-wheels will easily run over the joint between the two. The operation of this device will be similar to that previously described.

When a load is to be placed in the wagon, the rods 23 will be drawn out to their limit of movement, and with them the bearing-rods 25, and this portion will then project far enough behind the rear of the vehicle to admit of the bolster being turned at right angles upon the carriage and clear of the vehicle. In order to prevent this part from running back into the carriage, I have shown the pawl or some equivalent therefor, as at 28, the pawl being hinged to some fixed portion and engaging a notch in one of the slidable tracks 23. The load may then have one end rested upon the bolster 10, and being turned around into line with the vehicle the carriage or truck 8 may be pushed along the tracks 23 and 21 and the rear end of the load resting upon the roller 24 will move easily until it passes off the roller 24 and rests upon a permanent support 29, located just inside of the roller. In order to continue the movement, so that the load is entirely within the vehicle, the pawl 28 may be disengaged, and the rods 25 and tracks 23 are then free to slide easily into their position.

The back end of the vehicle will be cut away sufficiently to allow the roller 24 to lie inside of the rear line of the vehicle-body, and in this position the parts may be locked by a spring-latch 16 similar to that previously described.

In some cases where the load is too large to be conveniently placed upon the swiveling truck it is only necessary to remove the truck, and when the sliding rods 25 have been withdrawn, as previously described, the end of the box or load can be rested upon the roller 24 and pushed in, and the front end will travel upon the rollers 20 until it reaches its final position. The rods 25 may then be pushed into place and locked, as previously described.

Having thus described my invention, what I claim, and desire to secure by Letters Patent, is—

1. The combination with a vehicle and its bed of a carriage movable longitudinally thereon, stops to limit the rearward movement of the carriage, a truck adapted to travel upon the carriage, a burden-carrier having its front end supported upon a truck whereby it may be retracted with relation to the carriage, and a pivotal support about which the burden-carrier is turnable after being retracted.

2. The combination with a vehicle and its bed of a wheeled carriage, longitudinally-disposed rails upon which the wheels travel, a guide-rod fixed to the carriage, sleeves or bushings fixed to the bed through which said guide-rod is slidable and a burden-carrier mounted upon the bed and turnable independently thereof.

3. The combination with a vehicle-bed of a wheeled carriage, rails fixed to a bed upon which the carriage is movable, a guide-rod extending from end to end of the carriage, sleeves or bushings fixed to the bed through which said guide-rod is slidable and which serve to limit the rearward travel of the carriage, a stop against which the front end of the carriage rests when in position, and a latch engaging the rear end, and a burden-carrier slidable and turnably mounted upon the carriage.

4. The combination with a vehicle-bed of a carriage, longitudinally-disposed rails, wheels upon the bed adapted to travel upon the rails, a guide and stop mechanism controlling and limiting the rearward movement of the carriage, a truck and rails upon the carriage upon which the truck is movable, a bolster swiveled upon the truck, a burden-carrier having the front end fitted to rest upon the bolster, a support fixed to the rear end of the carriage upon which the rear end of the burden-carrier rests, said burden-carrier being capable of being withdrawn independently of the movement of the carriage and turnable upon the bolster-support after being withdrawn.

5. The combination with a vehicle-bed of a guided and longitudinally-movable carriage with latches to retain it in position in the vehicle and stops to limit its rearward movement, an elastic wheeled truck movable on guide-rails on the carriage, an elastically-supported bolster pivoted and turnable upon the truck, an elastic support fixed to the rear end of the carriage, a burden-carrier having the front end adapted to rest upon the bolster and the rear end upon the elastic support, said truck and burden-carrier being movable so as to be withdrawn to the rear end of the carriage and turnable with the bolster to a position at substantially right angles with the carriage and vehicle.

6. The combination with a vehicle-bed of a carriage, tracks upon which it is longitudinally movable, guides and stops by which the rear movement of the carriage is controlled and limited, an elastic frame-truck mounted upon wheels, guides upon the carriage upon which said truck is movable longitudinally, a transverse elastic support and bolster pivoted and turnable upon the truck, a burden-carrier having the front end fitted to engage and rest upon the bolster, an elastic fixed support at the rear end of the carriage upon which the rear end of the burden-carrier is supported, said burden-carrier being capable of retraction to the rear end of the carriage after the latter has been partially withdrawn from the vehicle and turnable with the bolster to place it at right angles with the carriage and exterior to the vehicle.

7. A vehicle having longitudinally-disposed tracks or guides, a truck movable thereon, a bolster pivoted and turnable upon the truck, and means to extend the truck-support so that the truck may be withdrawn and the bolster turned clear of the vehicle.

In testimony whereof I have hereunto set my hand in presence of two subscribing witnesses.

WILFRED R. HILL.

Witnesses:
   HENRY P. TRICOU,
   S. H. NOURSE.